United States Patent [19]

Croskell et al.

[11] Patent Number: 4,518,399
[45] Date of Patent: May 21, 1985

[54] PROCESS FOR RECOVERING GASES FROM LANDFILLS

[75] Inventors: Henry Croskell, St. Louis; Tommy E. Graham, Chesterfield, both of Mo.

[73] Assignee: Monsanto Company, St. Louis, Mo.

[21] Appl. No.: 644,090

[22] Filed: Aug. 24, 1984

[51] Int. Cl.³ .......................................... B01D 53/22
[52] U.S. Cl. ........................................ 55/16; 55/68;
210/603; 405/129
[58] Field of Search ........................... 55/16, 68, 158;
166/246, 261, 265–268; 210/603; 405/128, 129;
166/50, 250, 369

[56] References Cited

U.S. PATENT DOCUMENTS

| 4,026,355 | 5/1977 | Johnson et al. | 405/129 X |
|---|---|---|---|
| 4,043,395 | 8/1977 | Every et al. | 166/268 X |
| 4,130,403 | 12/1978 | Cooley et al. | 55/16 |
| 4,157,958 | 6/1979 | Chow | 210/603 |
| 4,171,017 | 10/1979 | Klass | 55/16 X |
| 4,252,548 | 2/1981 | Markbreiter et al. | 55/68 X |
| 4,320,802 | 3/1982 | Garbo | 166/266 X |
| 4,323,367 | 4/1982 | Ghash | 405/129 X |
| 4,354,936 | 10/1982 | Ishida et al. | 210/603 X |
| 4,386,159 | 5/1983 | Kanai | 210/603 X |
| 4,386,944 | 6/1983 | Kimura | 55/16 |
| 4,396,402 | 8/1983 | Ghosh | 405/129 X |
| 4,427,419 | 1/1984 | Li | 55/68 X |
| 4,442,901 | 4/1984 | Zison | 166/369 |
| 4,452,489 | 6/1984 | Richards | 166/50 X |
| 4,469,176 | 9/1984 | Zison et al. | 405/129 X |

Primary Examiner—Robert Spitzer
Attorney, Agent, or Firm—R. L. Broad

[57] ABSTRACT

A process for treating a landfill for recovering methane therefrom wherein a mixture of methane and carbon dioxide is withdrawn from a central portion of the landfill and the carbon dioxide and methane are separated. The methane is fed to a pipeline and a portion of the carbon dioxide is fed to wells spaced around the periphery of the landfill at a pressure of 7 to 170 kPa to prevent air from entering the landfill around the periphery thereof.

3 Claims, 1 Drawing Figure

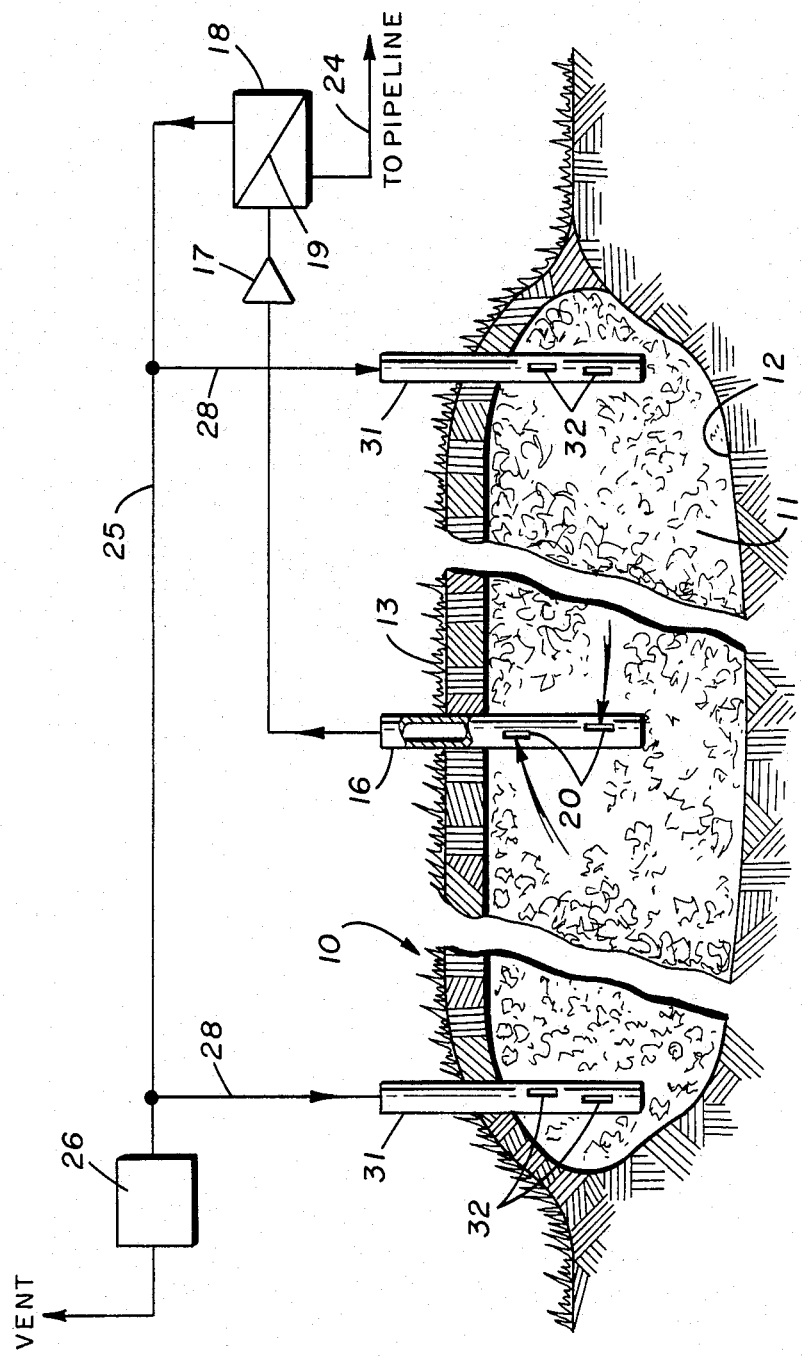

PROCESS FOR RECOVERING GASES FROM LANDFILLS

BACKGROUND

1. Field of the Invention

This invention relates to methods for treating landfills for recovering methane therefrom.

2. Prior Art

Anaerobic digestion of waste materials in a landfill produces a mixture of gases comprised primarily of carbon dioxide and methane. It is desirable to recover the methane from the landfill for use as a fuel source. Also, it is desirable to remove the methane from the landfill for the reason that it represents a serious safety hazard in the event that it seeps out of the landfill into a closed structure such as a building.

It is known to withdraw the gas mixture from the landfill and bring it into contact with one side of a membrane more permeable to carbon dioxide than to methane under a pressure sufficient to cause the carbon dioxide to permeate the membrane to the other side thereof and thereby become separated from the methane. There are also other methods of removing the carbon dioxide to thus upgrade the fuel value of the landfill-generated gas. These methods, such as absorption of the carbon dioxide in a solvent (amine scrubbing) or adsorption of the carbon dioxide on a solid material (e.g. molecular sieves or activated carbon) also produce high purity methane for use as a fuel. This upgrades the methane to a quality fuel, which can be substituted for or added to normal pipeline natural gas. Also, this substantially eliminates the safety hazard which can be encountered when the gas mixture leaks out of the landfill.

All of the normally practical techniques, i.e., membranes, absorption or adsorption, all suffer from the same limitation. That is, if in withdrawing the gas from the landfill, air is allowed to enter the landfill and contaminate the normal carbon dioxide/methane mixture, the nitrogen cannot effectively be removed and will become a contaminant in the product such that the product cannot be used as a fuel. Also, the oxygen in the air will retard or even stop the anaerobic digestion of organic waste materials in the landfill.

In order to prevent air form entering the landfill around the periphery of the earth cover over the landfill, it is known to install spaced wells around the periphery of the landfill and then, using a reduced pressure, withdraw gas from these wells and vent it to atmosphere. This will withdraw any air which has seeped into the periphery of the landfill but is wasteful in that the gas streams removed from the peripheral wells will contain a significant quantity of methane which is lost.

In enhanced oil recovery carbon dioxide is forced into a well under very high pressures, these pressures usually being sufficiently high that the carbon dioxide would normally be in a liquid state, to cause the carbon dioxide to travel through oil bearing formations to dissolve and carry to another well the oil being recovered.

SUMMARY OF THE INVENTION

A mixture of carbon dioxide and methane is withdrawn from a central well or plurality of wells in a landfill and processed by a known technique to remove carbon dioxide, thus upgrading the gas to a fuel grade natural gas. The methane is fed to a pipeline while the carbon dioxide is applied under a pressure of 7 to 170 kPa to a plurality of wells arranged around the periphery of the landfill. This prevents air from entering the landfill while avoiding the loss of methane from the landfill.

DESCRIPTION OF THE DRAWING

The single FIGURE of the drawing is a schematic cross-sectional view of a landfill showing apparatus used in carrying out the process of this invention.

DETAILED DESCRIPTION OF THE INVENTION

Referring now in detail to the drawing, there is shown a landfill 10 made up of garbage and waste materials 11 deposited in a earthen pit 12 and covered by an earth cap 13. Anaerobic digestion of organic materials by bacteria in the landfill generates a gas mixture which is made up of about 55% methane and 45% carbon dioxide with trace amounts of nitrogen. The purpose of this invention is to recover the methane generated in the landfill without having the landfill become contaminated by air seeping into the landfill around the periphery thereof.

Air seeping into the landfill creates two problems. First, the oxygen present in the air kills the bacteria which anaerobically digests the organic materials in the landfill. Second, the nitrogen present in the air cannot economically be separated from methane by a membrane or absorption or adsorption systems so that, if sufficient air leaks into the landfill, this methane cannot be recovered.

The mixture of gases, which is usually at a subatmospheric pressure, is withdrawn from a landfill 10 through one or more central wells in the form of tube 16 sunk into the landfill, the tube 16 having openings 20 through which the gas mixture enters the tube and is then passed through a compressor 17 to increase the pressure of the gas mixture to 550 kPa to 3100 kPa (80 to 450 psi). The gas mixture is then fed into a membrane separator 18 having a membrane 19 more permeable to carbon dioxide than to methane. The gas mixture is maintained in contact with the membrane under conditions such that sufficient carbon dioxide will permeate the membrane to leave a non-permeated gas mixture of at least 80% methane. This non-permeated gas is then fed through a line 24 to a distribution pipeline (not shown).

The permeated carbon dioxide leaves the membrane separator 18 through a line 25 and is vented to the atmosphere through a pressure controller 26 which maintains a pressure of 7 kPa to 170 kPa (1 to 25 psig) in the line 25. Lines 28 connected to the line 25 lead to wells located around the periphery of the landfill 10, these wells being in the form of tubes 31 which are sunk into the landfill and which are provided with openings 32. The pressure of the permeated carbon dioxide in the wells 31, being slightly above atmospheric, prevents any air from leaking into the landfill 10 around the periphery thereof.

It is not necessary that this carbon dioxide be actually forced into the landfill in any significant volume. The mere pressure of the carbon dioxide applied around the periphery of the landfill is sufficient to keep air from seeping into the landfill. While the preferred arrangement of the tubes 31 is around the outermost edge of the landfill 10, as shown on the drawing, it should be understood that the term "periphery" as used herein includes the cap 13. Thus, the tubes 31 may be sunk into or to a point just below the cap 13 to prevent air from leaking into the landfill through the cap 13.

While the carbon dioxide may be removed from the gas stream by the use of absorption or adsorption processes, it is preferred that the separation be done by using a membrane more permeable to carbon dioxide than to methane.

What is claimed:

1. A process for recovering methane from a landfill, comprising
   (a) providing at least one central well and a plurality of peripheral wells in the landfill,
   (b) withdrawing a mixture of methane and carbon dioxide from said central well,
   (c) separating the carbon dioxide from said mixture to provide a carbon dioxide enriched stream, and
   (d) applying a portion of the carbon dioxide enriched stream to said peripheral wells at a pressure of 7 kPa to 170 kPa.

2. The process of claim 1 wherein the carbon dioxide is separated from the gas mixture by bringing the mixture into contact with one side of the membrane more permeable to carbon dioxide than to methane under conditions such that sufficient carbon dioxide permeates the membrane to leave a non-permeated gas stream containing at least 80% methane.

3. The process of claim 2 wherein one of said conditions is that the gas mixture brought into contact said one side of said membrane is at a pressure of 550 kPa to 3100 kPa.

* * * * *